United States Patent Office 3,476,590
Patented Nov. 4, 1969

3,476,590
PROCESS FOR PREPARING POLYIMIDAZOLE RESINS AND USE THEREOF IN FORMING LAMINATES
Guy Rabilloud, Bernard Sillion, and Gabriel de Gaudemaris, Grenoble, France, assignors to Institut Francais du Petrole, des Carburants et Lubrifiants, Malmaison, Hauts-de-Seine, France
No Drawing. Filed May 2, 1967, Ser. No. 635,353
Claims priority, application France, May 5, 1966, 60,487
Int. Cl. C03c 25/02; C09d 3/48
U.S. Cl. 117—126      12 Claims

ABSTRACT OF THE DISCLOSURE

Polyimidazole resins produced by reacting an aromatic tetraamine with an aromatic polyanhydride. The reaction is carried out with heating either in the fused state or in an organic solvent. Organic solvent solutions of the resins can be used to impregnate materials such as glass fibers.

---

It is known to manufacture polyimidazoles of the polybenzimidazole type from an aryl diester of an aromatic diacid and an aromatic tetraamine having two amine groups in ortho position one with respect to the other (as described in French Patent 1,303,849). According to the method of operation, these polybenzimidazoles may be obtained as polymers of high melocular weight or fusible prepolymers. Although the polybenzimidazoles of high molecular weight are useful for the manufacture of films, fibers or molded articles, their substantial infusibility does not allow their use in the manufacture of laminates.

If conversely the fusible polymers are suitable for the manufacture of laminates, they exhibit the inconvenience of liberating a phenol in the ultimate step of polycondensation under pressure, which leads to the formation of a porous material. It seems thus desirable to use in some cases a raw material which generates benzimidazole rings with liberation of light products such as water.

According to this invention, there are obtained condensation polymers through a process consisting of reacting an aromatic polyanhydride with an aromatic tetraamine according to a two-step process.

In a first step, a partial polycondensation of the reactants is carried out, either by fusion of the same at a temperature preferably comprised between 150 and 300° C., or by heating in the presence of an organic solvent preferably of the polar type at a temperature comprised preferably between 120 and 250° C. More generally temperatures comprised between 100 and 300° C. are advantageous.

This step generates a composition having an inherent viscosity usually lower than 0.14 and comprised for instance between 0.02 and 0.14 (determined at 30° C. on a 0.5% by weight solution of the polycondensate in dimethylsulfoxide) and a softening temperature lower than 400° C.

The higher the temperature the quicker that the result is effected.

During a second step, the previous composition is dissolved, if it was not previously, in an organic polar solvent before being admixed with the solid reinforcing materials. The desirable concentration of the resin in the impregnating solution is usually comprised between 5 and 70% by weight, preferably between 25 and 50%. After the solvent has been evaporated, there is applied in tight contact the impregnated elements so as to obtain a laminate which is treated by heat at a temperature preferably higher than 300° C. and comprised for example between 310 and 400° C., under a sufficient pressure to allow the elements to adhere one to the other.

Equimolar proportions of the reactants are preferably used.

The solvents which may be used for carrying out the reaction, either in the first-step reaction or to conduct the impregnation, are quite numerous.

Any polar organic solvent may be used, which does not react appreciably with the reactants employed, for example dimethylsulfoxide, N-methylpyrrolidone, dimethylacetamide, hexamethylphosphoramide, pyridine, m-cresol and the like. By polar organic solvent is meant any liquid the molecule of which contains carbon, hydrogen and at least one other non-metallic element for example O, S, N, or P.

The following raw materials may be used by way of examples:

(1) Tetraamines.—The tetraamino homocyclic or heterocyclic aromatic compounds are selected so as to contain two reactive ortho-diamino centers. They answer to the following general formula:

  (I)

wherein the $NH_2$ groups are in ortho positions two by two and wherein A represents an aromatic homocyclic or heterocyclic nucleus. This nucleus may consist either:

(a) of one ring
(b) of several condensed rings
(c) of several distinct rings connected therebetween, the binding elements being preferably the direct carbon-carbon bond or a group such as $CH_2$, CO, $C(CH_3)_2$, O, S, SO, or $SO_2$.

In the latter two cases (b) and (c) the two ortho-diamino reactive centers may be fixed on distinct rings.

As aromatic nuclei A which can be used, after substitution by two ortho-diamino centers, the following may be named by way of non-limitative example:

Benzene, toluene, xylene, thiophene, pyrrole, pyridine, pyrazine. The corresponding tetraamines are thus by example 1,2,4,5-tetraaminobenzene, 2,3,5,6-tetraaminotoluene, 2,3,5,6-tetraaminopyridine and the like.

Naphthalene, indene, heptalene, fluorene, phenalene, phenanthrene, anthracene, naphthacene, pentacene, indole, purine, isoquinoline, quinoline and the like. The corresponding tetraamines will then be, for example, 2,3,6,7-tetraaminonaphthalene, 2,3,7,8-tetraaminoheptalene, 2,3, 6,7,-tetraaminoquinoline.

Biphenyl, diphenylmethane, diphenylether, diphenylsulfoxide, diphenylsulfone and the like; the corresponding tetraamines will be for example 3,3',4,4'-tetraaminobiphenyl, 3,3',4,4'-tetraaminobiphenylmethane, 3,3',4,4'-diphenylsulfone.

(2) Aromatic polyanhydrides.—All polyanhydrides obtained by polycondensation of aromatic diacids of the homocyclic or heterocyclic series may be used. These polyanhydrides contain the following recurring unit and thus answer to the general formula:

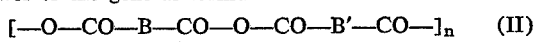  (II)

wherein $n$ is an integer higher than 1 and B and B' are aromatic nuclei which may be formed:

(a) of one ring
(b) of several condensed rings
(c) of several distinct rings connected therebetween, the binding elements being the direct carbon-carbon bond or a group such as for example $CH_2$, $C(CH_3)_2$, CO, O, S, SO, or $SO_2$.

The above-given examples of aromatic nuclei A may also be used for the aromatic nuclei B and B' of Formula II above.

These examples also are not limitative. Here also, the two carboxy groups may be located on distinct nuclei in cases (b) and (c).

By way of non-limitative examples of polyanhydrides which may be used as reactants in this invention, those which are obtained by polycondensation of the following diacids will be named:

Isophthalic acid, terephthalic acid, 2,6-pyridine dicarboxylic acid, 3,5-pyridine dicarboxylic acid, 3,5-pyrazine dicarboxylic acid, 2,5-thiophene dicarboxylic acid, 2,4-furan dicarboxylic acid.

1,6-naphthalene dicarboxylic acid, 2,7-fluorodicarboxylic acid, 2,5-anthracene dicarboxylic acid, 2,6-azulene dicarboxylic acid.

4,4'-biphenyl dicarboxylic acid, 4,4'-diphenylether dicarboxylic acid, 3,3'-diphenylmethane dicarboxylic acid, 4,4'-diphenylsulfoxide dicarboxylic acid 4,4'-diphenylsulfonedicarboxylic acid.

The polyanhydrides which may be used in this invention are manufactured according to polycondensation methods described in the literature. They usually exhibit an inherent viscosity comprised between 0.02 and 0.30 and preferably between 0.05 and 0.20 (determined at 30° C. at a concentration of 0.5% by weight of polymer in dimethylsulfoxide).

The polyanhydrides may be prepared either from individual acids or from mixtures thereof.

One may also react, according to this process, mixtures of various tetraamines and/or polyanhydrides.

The inherent viscosity is determined according to the equation:

$$\eta_{inh} = \frac{\mathrm{Log}_e \eta_{relat}}{C} = \frac{\mathrm{Log}_e \frac{\eta}{\eta_0}}{C}$$

wherein $\eta$ relat is the relative viscosity of a solution, i.e. the ratio of the kinematic viscosity $\eta$ of a solution of polymer to the kinematic viscosity $\eta_0$ for the pure solvent.

The ratio $\eta/\eta_0$ may be easily determined, for example, by measure of the flowing time $t$ in a capillary tube of a diluted solution of the polymer and that of the pure solvent $t_0$ $$\frac{\eta}{\eta_0} = \frac{t}{t_0}$$

C is the concentration of the polymer in the solvent.

In the following examples, given by way of illustration, not limitation, the solvent used to determine the viscosity is dimethylsulfoxide (DMSO), the concentration of polymer in this solvent being 0.5% by weight. The determinations are carried out at 30° C.

EXAMPLE 1

In a conical flask of 25 ml. capacity and which is fed with an argon flow, there is introduced 3.21 g. (0.15 mole) of 3,3'-diaminobenzidine and 3.22 g. (about 0.15 mole) of isophthalic polyanhydride and an inherent viscosity of 0.12 (at 30° C. and 0.5% in dimethylsulfoxide). The mixture is heated by means of a metallic bath at 235° C. up to complete fusion (about 5 minutes). The reaction is followed by repeated samplings of polymer to determine the inherent viscosity of the same. After one hour at 235° C., the temperature is raised stepwise to 300 and then 350° C. The thermal treatment at this latter temperature makes the polymer infusible and insoluble in conventional organic solvents.

| Reaction temperature, ° C. | Time (min.) | Inherent viscosity at 0.5% by weight in DMSO |
|---|---|---|
| 235 | 15 | 0.065 |
|  | 30 | 0.079 |
|  | 40 | 0.084 |
|  | 50 | 0.087 |
|  | 60 | 0.088 |
| 250 | 70 | 0.096 |
| 300 | 80 | 0.112 |
|  | 85 | 0.145 |
| 350 | 95 | Insoluble |

EXAMPLE 2

A mixture of 2.96 g. (0.02 mole) of isophthalic polyanhydride (inherent viscosity of 0.10 in DMSO) and 4.28 g. (0.02 mole) of 3,3'-diaminobenzidine is melted at 230° C. under an inert atmosphere for 45 min. After cooling, 10 ml of dimethylsulfoxide are added and a glass cloth is impregnated with this solution. The solvent is evaporated at 120° C. and 15 mm., Hg of several hours.

Pieces of dry impregnated cloth are superposed, molded and pressed for 3 hours at 260° C. under a pressure of 20 kg. per sq. cm. After cooling, samples are cut in the laminate to check the mechanical characteristics of the material. The average values of the breaking loads are about 46 to 47 kg./cm.$^2$.

EXAMPLE 3

In this example, there is shown that the mechanical characteristics of the laminate are higher when the starting polymer which was used to manufacture the resin had a larger viscosity.

The impregnating resin is prepared as in the previous example by fusion of approximately equimolar amounts of 3,3'-diaminobenzidine and isophthalic polyanhydride the inherent viscosity of which (at 0.5% in DMSO) is between 0.047 and 0.12.

The pressing conditions being the same as in Example 2, the samples have the following mechanical characteristics:

| Inherent viscosity of the polyanhydride— At 0.5% in DMSO: | Breaking loads in kg./mm.$^2$ |
|---|---|
| 0.047 | 28 |
| 0.050 | 32 |
| 0.069 | 37 |
| 0.075 | 42 |
| 0.10 | 47 |
| 0.12 | 50 |

EXAMPLE 4

The resistance of the material towards heat is determined by preparing a laminate identical with that of Example 2, from 5.92 g. isophthalic polyanhydride (inherent viscosity of 0.094 at 0.5% in DMSO) and 8.56 g. of 3,3'-diaminobenzidine. The reaction takes one hour and 30 minutes at 230° C. and the resulting resin is dissolved into 20 ml of DMSO to facilitate the impregnation.

The obtained laminate exhibits the following breaking loads:

46 kg./mm.$^2$ at normal temperature
45 kg./mm.$^2$ after 10 min. at 250° C.
43 kg./mm.$^2$ after 10 min. at 300° C.

What is claimed is:

1. A process for manufacturing an article comprising glass fibers having a coating of the polyimidazole type wherein, in a first step, an aromatic tetraamine of the general formula:

(I)

is reacted with an aromatic polyanhydride having the recurring unit:

[—O—CO—B—CO—O—CO—B'—CO—]  (II)

said polyanhydride having an inherent viscosity of 0.02 to 0.30 as determined at 30° C. at a concentration of 0.5% by weight of polymer in dimethylsulfoxide, so as to form a resin of inherent viscosity, determined at 30° C. in dimethylsulfoxide for a concentration by weight of polymer of 0.5%, comprised between 0.02 and 0.14, and then, in a second step, glass fibers are impregnated by means of a solution, in an organic solvent, of the resin resulting from the first step, and finally, in a third step, the impregnated material is heated so as to evaporate the solvent and achieve the reaction, wherein A, B and B' represent aromatic homocyclic or heterocyclic nuclei formed on one ring, several condensed rings or several distinct rings connected therebetween by a carbon-carbon bond or by $CH_2$, $C(CH_3)_2$, CO, O, S, SO, or $SO_2$ groups.

2. Process according to claim 1, wherein the solvent used in the second step is a polar organic solvent.

3. Process according to claim 2, wherein the solvent is dimethylsulfoxide, N-methylpyrrolidine, dimethylacetamide, hexamethylphosphoramide or pyridine.

4. Process according to claim 1, wherein the impregnated solution contains 5–70% by weight of resin.

5. Process according to claim 1, wherein the impregnated material is heated during the third step at a temperature higher than 300° C.

6. Process according to claim 5, wherein the impregnated material is heated during the third step at a temperature between 310 and 400° C.

7. A process for manufacturing polyimidazoles which comprises reacting an aromatic tetraamine of the formula:

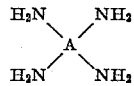

with an aromatic polyanhydride having the recurring unit:

[—O—CO—B—CO—O—CO—B'—CO—]

wherein A, B and B' are homocyclic or heterocyclic aromatic nuclei, said polyanhydride having an inherent viscosity of 0.02 to 0.30 as determined at 30° C. at a concentration of 0.5% by weight of polymer in dimethylsulfoxide.

8. Process according to claim 7, wherein the reaction is carried out up to the obtainment of a polyimidazole of an inherent viscosity, measured at 30° C. for a concentration of 0.5% by weight in dimethylsulfoxide, comprised between 0.02 and 0.14.

9. Process according to claim 7, wherein the reaction temperature is 100–300° C.

10. Process according to claim 7, wherein the reactants are reacted in the fused state at 150–300° C.

11. Process according to claim 7, wherein the reaction is carried out in an inert organic solvent at a temperature of 120–250° C.

12. Process according to claim 11, wherein the solvent is dimethylsulfoxide, N-methylpyrrolidene, dimethylacetamide, hexamethylphosphoramide or pyridine.

References Cited
UNITED STATES PATENTS

| 2,960,493 | 11/1960 | Conix | 260—47 |
| 3,174,947 | 2/1962 | Marvel et al. | 260—47 |
| 3,300,334 | 1/1967 | Gosnell | 117—126 |

FOREIGN PATENTS

| 838,986 | 6/1960 | Great Britain. |
| 998,356 | 7/1965 | Great Britain. |

JOSEPH L. SCHOFER, Primary Examiner

C. A. HENDERSON, JR., Assistant Examiner

U.S. Cl. X.R.

117—161; 161—93, 192; 260—78.4, 47, 63